June 20, 1944.  G. H. THOMPSON  2,351,789
WELDING STINGER
Filed June 30, 1943
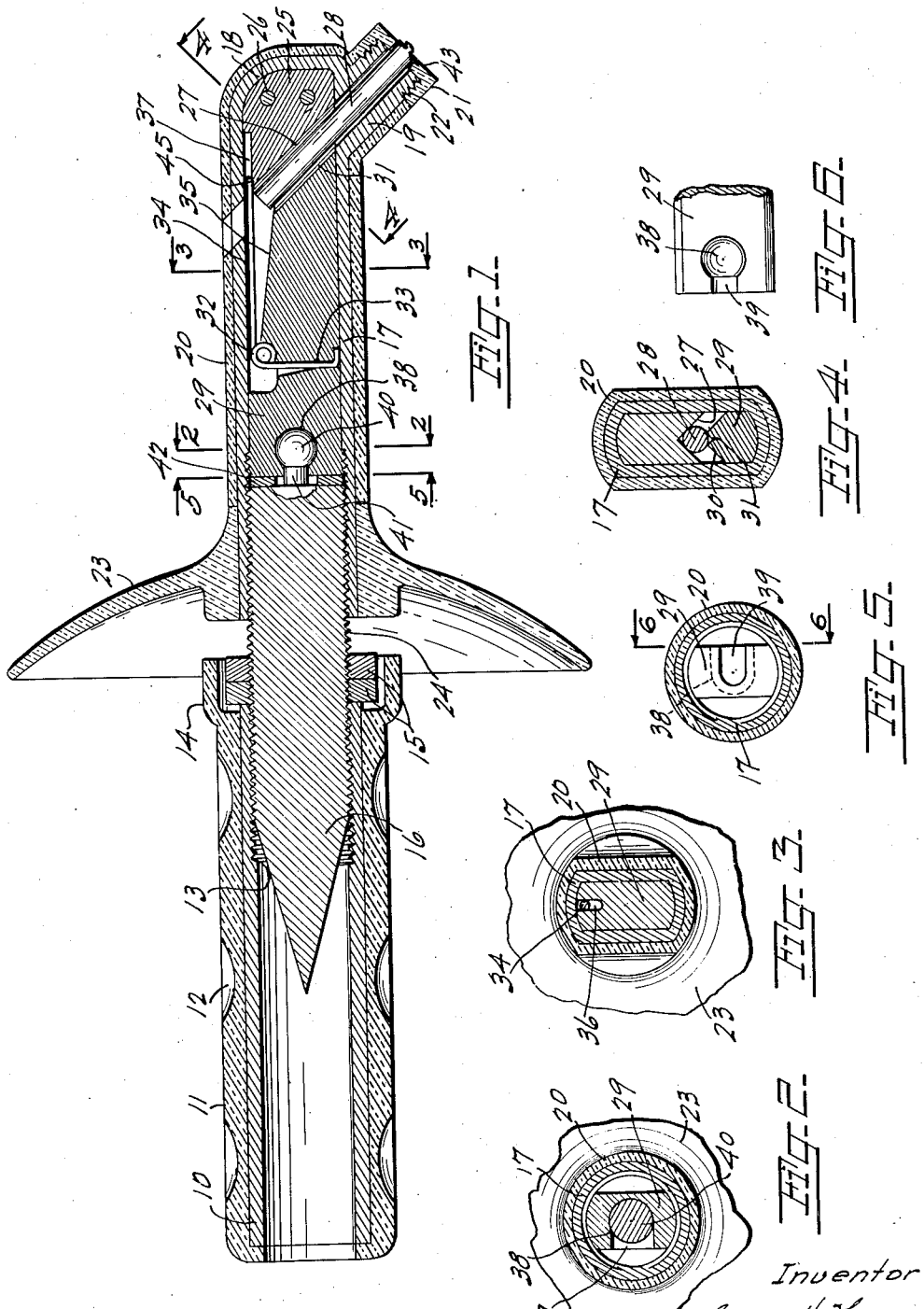
Inventor
George H. Thompson
By Philip A. Tredell
Attorney Patented June 20, 1944

2,351,789

UNITED STATES PATENT OFFICE 2,351,789

WELDING STINGER

George H. Thompson, Oakland, Calif.

Application June 30, 1943, Serial No. 492,956

3 Claims. (Cl. 219—8)

This invention, a welder's stinger, sometimes referred to as an electrode holder, is an improvement over conventional stingers in that exceptionally high current carrying capacity is provided through the specific type of structure, and in that automatic ejection means is provided for ejecting the stub of the welding rod.

Conventional stingers usually have some portion of the structure between the cable connection and the welding rod where the current carrying capacity is considerably reduced, thereby causing unnecessary heating of the entire structure. They also have no means for ejecting the stubs of welding rods though in many cases the rod is consumed clear to the point where it enters the chuck, under which conditions it is necessary to tap the stinger on some solid object and a drift pin or similar instrument may even be required to push the stub out of the chuck.

My welder's stinger has high current carrying capacity throughout the entire structure, from the cable connection to the welding rod, thereby keeping the amount of heat generated at an absolute minimum, and it also has an automatic ejector which ejects the stud of the welding rod as soon as the rod has been released through adjustment of the chuck.

The objects and advantages of the invention are as follows:

First, to provide a stinger in which the current carrying capacity is not diminished at any point so as to maintain heat generated through resistance at an absolute minimum.

Second, to provide a stinger as outlined with special chucking means to provide the most efficient gripping of the rod coupled with maximum effective contact.

Third, to provide a stinger as outlined in which the chucking means is easily and rapidly removable and replaceable.

Fourth, to provide a stinger as outlined with automatic stub ejecting means, operable upon release of the stub by the chucking means.

Fifth, to provide a hand guard for protection against sparks and spatter from the welding arc.

Other objects and advantages of the invention will become apparent as the following description is read on the drawing forming a part of this specification, and in which:

Fig. 1 is a longitudinal sectional elevation through the invention.

Fig. 2 is a section taken on line 2—2 of Fig. 1.

Fig. 3 is a section taken on line 3—3 of Fig. 1.

Fig. 4 is a section taken on line 4—4 of Fig. 1 and shows the shapes of the fixed and movable dies.

Fig. 5 is a section taken on line 5—5 of Fig. 1.

Fig. 6 is a section taken on line 6—6 of Fig. 5 with the metal sleeve and insulation omitted, and showing the quick-change connection.

The invention includes a handle, a chuck, an automatic stub ejector, and a spark shield.

The handle may be of any suitable type and is illustrated as consisting of a metal sleeve 10 covered by an insulating sleeve 11 with vacuum cups 12 formed in the surface, the metal sleeve being internally threaded at one end as indicated at 13, and the insulating sleeve having an enlargement 14 extending beyond the said one end of the metal sleeve to cover and protect the locknuts 15 and which locknuts are used to lock the combined retractor and cable spreader 16 to the handle.

The chuck includes a metal sleeve 17 which is cylindrical at one end approximately to the line 2—2, and internally threaded to receive the portion of the retractor 16 which projects beyond the locknuts, and therefrom is substantially rectangular in cross-section as indicated in Fig. 3, with the other end closed as indicated at 18, and having a cylindrical projection 19 extending diagonally from the lower surface with an axial bore to receive the largest size of welding rod to be used.

The metal sleeve 17 is insulated throughout as indicated at 20, and a removable insulating tip 21 is provided for the projection 19 and is attachable by any suitable means, such as the threads 22. A shield 23 formed of suitable insulating material is secured on the sleeve 17 and may be formed integrally with the insulation 20, but is preferably formed separately and removably mounted by forcing it over the cylindrical portion 17, in which case the shield can be replaced in the event of damage or breakage. As will be noted, this shield prevents sparks from reaching the handle or the exposed metal portion at 24. Obviously, other cable connecting means can be used, and the retractor can be made as an integral part of the handle.

The fixed die 25 can be riveted in place as indicated at 26 and has a V-groove 27 formed in its gripping face to form one of the chucking members for the welding rod 28, the chucking face and V-groove being formed diagonally to the axis of the sleeve, preferably at an angle of about 45°.

The movable die 29 is formed to a wedge shape at its gripping end as indicated at 30, with a V-groove formed in the apex as indicated at 31 to provide a double bite into the side of the welding rod as is clearly illustrated in Fig. 4, this wedge end and V-groove also being formed diagonally to the axis of the sleeve and parallel to the cooperative face of the fixed die. This die 29 is slidable in the substantially rectangular portion of the sleeve 17 and has a spring 32 secured therein with one arm 33 anchored at its lower end in the movable die and the other end free to flex backwardly, and with the other arm 34 normally lying under tension on the bottom 35 of the groove 36 formed in the top of the die and being slidable into a recess 37 formed in the top of the fixed die when the arm is raised.

The other end of the movable die has a ball socket 38 which is formed by drilling into the side of the die and bottoming with a spherical seating tool and then milling through the end as indicated at 39, to receive the ball 40 with its connecting neck 41 which projects from the end of the retractor, by insertion through the side, and a thrust washer 42 is provided between the end of the retractor and the movable die to reduce friction.

The operation of the invention is as follows: The movable die is retracted by turning the handle 10, 11 with the retractor 16 locked thereto, in one direction relative to the sleeve 17. A welding rod is slipped through the passage 43 and forced to raise the spring arm 34, and the handle and sleeve are then turned in the other relative direction which forces the end of the spring arm into the recess 37 and the rod is gripped between the diagonal faces of the V-groove 27 and the sharp edges 44 of the movable die, this gripping action being 1.4 times as great as a direct axial thrust, and the area of contact is also 1.4 times as great as if the gripping faces were at right angles to the axis of the sleeve, thus providing an efficient grip and conductive connection, and furthermore, the gripping action is provided at four points and will accommodate any size of welding rod up to the width of the dies. If the chuck is adjusted only enough to release the welding rod, then when the new rod is forced against the spring arm, the spring will deflect backwardly and when it reaches the recess will snap into place so that no pressure will be required on the rod while the chuck is adjusted to gripping position.

If the welding rod is burnt too short to permit ready removal, the stub will be ejected as soon as the grip is released on it by relative turning of the handle and sleeve, which draws the spring arm 34 off of the edge 45 of the bottom wall of the recess 37, and as the spring arm is under tension, it snaps against the top of the stub and drives it out of the passage 43.

In the event that the spring 32 should fail or something else go wrong with the movable die, it will merely be necessary to unscrew the retractor from the sleeve to withdraw the movable die. The die can be removed from the ball joint by merely moving it to one side, the ball and its neck passing through the slot. Another movable die can be slid onto the ball and then slid into the sleeve and the retractor then screwed back into place.

It will be understood that variations in construction and arrangement of parts, which variations are consistent with the appended claims may be resorted to without detracting from the spirit or scope of the invention, or sacrificing any of the advantages thereof.

I claim:

1. A welder's stinger, in combination, a handle and a chuck operatively connected, with said chuck operable through relative rotation of said handle in opposite directions for respectively gripping and releasing a welding rod, and ejector means operatively associated with said chuck for ejecting the stub of the welding rod through relative rotation of said handle for releasing the rod; said ejector means comprising a spring retained under tension over the upper end of the welding rod when the rod is gripped, and released to eject the stub of the welding rod when said chuck is adjusted by relative rotation of said handle to release the stub.

2. A welder's stinger comprising; a sleeve internally threaded at one end, and a threaded member having one end fixed in a handle therefor and with the other end threadedly adjustable in said sleeve; a fixed rod-gripping die in the other end of said sleeve and a movable die slidable in said sleeve and having an operative connection with said threaded member for advancing and retracting said movable die for respectively gripping and releasing a welding rod with relative rotative movement of said sleeve and said threaded member; ejector means comprising a spring fixed under tension in said movable die and a recess formed to receive said spring in a normal deflected position; a second recess formed in the upper end of said fixed die to receive and retain the end of said spring in raised position under increased tension when a welding rod is gripped between said fixed and movable dies; retraction of said movable die to release the stub of the welding rod coincidently retracting said spring from said second recess for striking the upper end of the stub to eject the stub.

3. A welder's stinger comprising; a handle having an axial threaded projection; a sleeve internally threaded at one end and fitting said threaded projection; a fixed die having a gripping face with a V-groove formed therein and inclined to the axis of said sleeve and mounted in the other end thereof; a movable die slidable and non-rotatable in said sleeve and having its gripping face parallel to the gripping face of said fixed die; and a swivel connection between the end of said threaded projection and said movable die; a recess formed in the top of said movable die and a spring arm anchored at one end in said movable die and under tension to depress against the bottom of said recess and with the free end extending beyond the face of said movable die; and a recess formed in the top of said fixed die to receive the free end of said spring arm when said free end is manually raised through the medium of a welding rod passing between the faces of said dies coincident with relative rotation of said handle and said sleeve in one direction, and withdrawn from said recess to eject a welding rod upon relative rotation of said handle and said sleeve in the opposite direction for release of the welding rod from between said faces.

GEORGE H. THOMPSON.